United States Patent Office 2,698,062

Patented Dec. 28, 1954

2,698,062

METHOD OF FORMING A SILICA GEL AND DRYING AIR THEREWITH

Preston L. Veltman, Severna Park, and Stephen S. Hubbard, Baltimore, Md., assignors to W. R. Grace & Co., Norwalk, Conn., a corporation of Connecticut No Drawing. Application December 22, 1949, Serial No. 134,588

3 Claims. (Cl. 183—114.2)

This invention relates to silica gel and more particularly to a silica gel having improved moisture adsorption characteristics.

One of the important uses of silica gel is to maintain the relative humidity of an atmosphere in which steel or iron equipment, such as accurately machined machinery parts, are stored to prevent rusting below 40%. Since the relative humidity of the atmosphere, particularly during the summer months is ordinarily well above 40% in certain regions of the country, the amount of silica gel required to insure low humidity may be rather large. The amount of silica gel required will depend upon the ability of that gel to adsorb moisture from atmospheres having a relative humidity of 40% or below. Good grades of silica gel of the type heretofore available will adsorb moisture in quantities equal to about 22 to 23% of the weight of the gel from atmospheres having a relative humidity of 40%.

It is an object of this invention to provide an improved silica gel having a moisture adsorption capacity increased over that of commercially available gels, particularly when exposed to atmospheres having a relative humidity in the range of 40% and below.

Another object of this invention is to provide a new method of preparing a silica gel having an improved moisture content.

With these and other objects in view, as will become apparent in the following detailed description, this invention resides in a moisture adsorbent silica gel of improved moisture adsorbent characteristics, and its method of manufacture in which the gel contains small amounts of alumina in concentrations ranging from about 0.1 to 0.3%.

The novel silica gel of this invention consists primarily of a clear, homogeneous silica hydrogel into which alumina has been introduced in concentrations to form a silica-alumina gel containing about 0.1 to 0.3% alumina. The gel is chiefly characterized by an increased moisture adsorption capacity about 25% greater than the good grades of adsorptive silica gels heretofore available. The improved gel is prepared by contacting a clear washed silica hydrogel with a very dilute and weakly acid solution of a soluble aluminum salt for a period sufficient to distribute the alumina through the hydrogel, after which the gel is separated from the salt solution, dried and activated.

As an example of the manufacture of a gel according to this invention, a silica hydrosol containing about 17% silica is formed by the rapid and vigorous mixing of sodium silicate with an acid such as sulphuric acid. An excess of acid is employed throughout the mixing to maintain the acidity of the reaction products at about one-half normal. The hydrosol is allowed to set to form a clear homogeneous hydrogel which is broken up and washed with water at a temperature of 110° F. and a pH of about 4½ for about forty hours.

In the preferred form of this invention, the washed silica hydrogel is impregnated with small amounts of aluminum by maintaining it in contact with a dilute solution of aluminum formate. The aluminum formate solution will preferably contain approximately 0.05% $Al_2O_3$ with sufficient formic acid present to maintain the solution at a pH of about 4. The contact between the washed silica hydrogel and aluminum formate solution may be obtained by merely soaking the gel in the solution for about five hours at atmospheric temperature. In some instances, it will be desirable to circulate the aluminum formate solution over the silica hydrogel to insure thorough and uniform contact with the aluminum salt solution. Sufficient alumina is distributed through the hydrogel in this manner to form a gel having a concentration of about 0.1 to 0.3 alumina after the subsequent drying and activation steps.

After the hydrogel and salt solutions have been maintained in contact for a period sufficient to impregnate the hydrogel with the required concentration of alumina, the salt solution is drained from the hydrogel which is then dried and activated to a total volatile content of about 6%. The drying and activation of the hydrogel may be accomplished by the conventional steps ordinarily used in the production of moisture adsorptive silica gels heretofore available.

The introduction of alumina into the silica gel may be accomplished by treating a washed silica hydrogel with any soluble salts of aluminum as well as with aluminum formate. For example, aluminum chloride, aluminum sulphate, and aluminum nitrate to which sufficient acid has been added to prevent hydrolysis of the aluminum salt from the extremely dilute solutions may be employed. The concentration of the salt in the solution may be increased to as high as 0.2% $Al_2O_3$.

The improved gel prepared according to this invention has an adsorptive capacity greatly increased over the silica gels heretofore commercially available. For purposes of comparison, a silica gel was prepared according to the method described in the above example with the exception that the gel was dried and activated to a total volatile content of around 6% immediately after washing for forty hours with water at a temperature of 110° F. and a pH of about 4½. Thus, the comparative gel was prepared by a method differing from the example of this invention only in that alumina was not introduced into the gel. The method by which the comparative gel is made is commonly employed in the manufacture of commercial silica gels for use as moisture adsorbents. The moisture adsorption properties of the gel made by the process of this invention and the comparative silica gels are set forth in the table.

TABLE

*Moisture adsorption, percent of weight of gel*

| Relative Humidity | Currently Available Silica Gel | Gel Made by the Process of this Invention | Percent Increase in Adsorption |
|---|---|---|---|
| 20 | 12½ | 14 | 12.0 |
| 30 | 17 | 21 | 23.6 |
| 40 | 23 | 29 | 27.2 |
| 60 | 32 | 38 | 18.7 |

Referring to the table, it will be noted that the gel prepared according to this invention has an increased moisture adsorption capacity over that of the currently available gels of approximately 25% when exposed to an atmosphere having a relative humidity of about 40%. This improved adsorption characteristic permits important savings in the amount of gel required to maintain the relative humidity of an atmosphere below a desired maximum, and particularly when the relative humidity is to be kept below 40%.

An improved silica gel may be prepared according to this invention from silica hydrogels widely different from the hydrogel in the application set forth above. For example, a clear hydrogel containing approximately 9% silica may be prepared by rapidly mixing sodium silicate and sulphuric acid to form a hydrosol. Both of the reacting solutions have densities around 20° Bé., and are mixed in proportions to form a mixture having an acidity of 2 normal. The hydrosol is allowed to set to a clear homogeneous hydrogel, after which it is thoroughly washed. Introduction of the small amount of alumina into the hydrogel is obtained by soaking the hydrogel in dilute solutions of aluminum salts in the manner described above. The aluminum salt solution is drained from the hydrogel and the hydrogel is dried and activated by conventional processes to produce a silica gel of greatly improved moisture adsorption capacity.

While this invention has been described with reference to details of a particular modification of the invention, it is to be understood that the scope of the invention is not limited to those details, but is defined by the appended claims.

We claim:

1. In a process for the manufacture of a silica gel desiccant, the improvement comprising soaking a washed silica hydrogel in an aqueous solution containing about 0.05 to 0.2% aluminum formate calculated as alumina and having a pH of about 4 to prevent hydrolysis of the aluminum salt until the hydrogel is impregnated in an amount sufficient to yield a final silica gel containing about 0.1 to 0.3% alumina, and drying and thermally activating the resulting gel.

2. The method of enhancing the moisture adsorptive properties of a silica gel desiccant comprising forming a silica hydrogel, washing the silica hydrogel, contacting the washed hydrogel with an aqueous solution of aluminum formate acidified with formic acid to a pH of about 4 until the hydrogel is impregnated with the aluminum salt in an amount sufficient to yield a final gel containing about 0.1 to 0.3% of alumina, and drying and thermally activating the resulting gel.

3. A method of drying moisture-laden air comprising contacting said air with an improved desiccant prepared by forming a silica hydrogel, washing the silica hydrogel, contacting the washed hydrogel with an aqueous solution of aluminum formate acidified with formic acid to a pH of about 4 until the hydrogel is impregnated with a aluminum salt in an amount sufficient to yield a final gel containing about 0.1 to 0.3% of alumina, and drying and thermally activating the resulting gel.

References Cited in the file of this patent

UNITED STATES PATENTS

| Number | Name | Date |
|---|---|---|
| 2,204,673 | Fulton et al. | June 18, 1940 |
| 2,363,858 | Fulton et al. | Dec. 28, 1944 |
| 2,391,482 | Ruthruff | Dec. 25, 1945 |
| 2,437,533 | Huffman | Mar. 9, 1948 |
| 2,462,798 | Wilson | Feb. 22, 1949 |
| 2,470,142 | Chapman | May 17, 1949 |
| 2,581,228 | Bailey et al. | Jan. 1, 1952 |